United States Patent
Coatney et al.

(10) Patent No.: US 7,650,412 B2
(45) Date of Patent: Jan. 19, 2010

(54) SYSTEMS AND METHOD OF IMPLEMENTING DISK OWNERSHIP IN NETWORKED STORAGE

(75) Inventors: Susan M. Coatney, Cupertino, CA (US); Alan L. Rowe, San Jose, CA (US); Radek Aster, Campbell, CA (US); Joydeep Sen Sarma, Redwood City, CA (US)

(73) Assignee: NetApp, Inc., Sunnyvale, CA (US)

( * ) Notice: Subject to any disclaimer, the term of this patent is extended or adjusted under 35 U.S.C. 154(b) by 484 days.

(21) Appl. No.: 10/027,457

(22) Filed: Dec. 21, 2001

(65) Prior Publication Data

US 2003/0120743 A1 Jun. 26, 2003

(51) Int. Cl.
G06F 15/16 (2006.01)

(52) U.S. Cl. ............ 709/226; 709/211; 709/208; 709/229

(58) Field of Classification Search ............ 709/245, 709/203, 217, 226, 211, 208, 229; 711/112, 711/156; 714/4, 6
See application file for complete search history.

(56) References Cited

U.S. PATENT DOCUMENTS

| 5,157,667 A | 10/1992 | Carusone et al. |
|---|---|---|
| 5,163,131 A | 11/1992 | Row et al. |
| 5,355,453 A | 10/1994 | Row et al. |
| 5,485,579 A | 1/1996 | Hitz et al. |
| 5,787,460 A | 7/1998 | Yashiro et al. |
| 5,790,782 A | 8/1998 | Martinez et al. |
| 5,802,366 A | 9/1998 | Row et al. |
| 5,812,761 A | 9/1998 | Seki et al. |
| 5,819,292 A | 10/1998 | Hitz et al. |
| 5,835,940 A | 11/1998 | Yorimitsu et al. |
| 5,872,903 A | 2/1999 | Morita et al. |
| 5,892,955 A | 4/1999 | Ofer |
| 5,894,588 A * | 4/1999 | Kawashima et al. ......... 710/68 |
| 5,931,918 A | 8/1999 | Row et al. |
| 5,941,972 A | 8/1999 | Hoese et al. |
| 5,954,822 A | 9/1999 | Yashiro et al. |
| 5,963,962 A | 10/1999 | Hitz et al. |
| 6,038,570 A | 3/2000 | Hitz et al. |
| 6,044,444 A | 3/2000 | Ofek |
| 6,065,037 A | 5/2000 | Hitz et al. |
| 6,128,734 A | 10/2000 | Gross et al. |

(Continued)

OTHER PUBLICATIONS

American National Standards Institute, Inc.; American National Standard for Information Technology; Fibre Channel—Physical and Signaling Interface (PC-PH); Nov. 14, 1994.

(Continued)

Primary Examiner—William C Vaughn, Jr.
Assistant Examiner—Djenane M Bayard
(74) Attorney, Agent, or Firm—Cesari and McKenna, LLP (57) ABSTRACT

A system and method for disk ownership in a network storage system. Each disk has two ownership attributes set to show that a particular file server owns the disk. In a preferred embodiment the first ownership attribute is the serial number of the file server being written to a specific location on each disk and the second ownership attribute is setting a SCSI-3 persistent reservation. In a system utilizing this disk ownership method, multiple file servers can read data from a given disk, but only the file server that owns a particular disk can write data to the disk.

34 Claims, 7 Drawing Sheets

U.S. PATENT DOCUMENTS

| | | | |
|---|---|---|---|
| 6,148,414 | A | 11/2000 | Brown et al. |
| 6,233,242 | B1 | 5/2001 | Mayer et al. |
| 6,317,844 | B1 | 11/2001 | Kleiman et al. |
| 6,374,300 | B2 | 4/2002 | Masters |
| 6,425,035 | B2 | 7/2002 | Hoese et al. |
| 6,470,382 | B1* | 10/2002 | Wang et al. ............... 709/220 |
| 6,513,097 | B1 | 1/2003 | Beardsley et al. |
| 6,622,163 | B1* | 9/2003 | Tawill et al. ............... 709/211 |
| 6,654,902 | B1* | 11/2003 | Brunelle et al. ............... 714/4 |
| 6,658,587 | B1* | 12/2003 | Pramanick et al. ............ 714/5 |
| 6,697,924 | B2 | 2/2004 | Swank |
| 6,708,265 | B1 | 3/2004 | Black |
| 6,718,361 | B1 | 4/2004 | Basani et al. |
| 6,732,289 | B1* | 5/2004 | Talagala et al. ............... 714/6 |
| 6,748,447 | B1 | 6/2004 | Basani et al. |
| 6,757,695 | B1 | 6/2004 | Noveck et al. |
| 6,760,862 | B1 | 7/2004 | Schreiber et al. |
| 6,804,703 | B1* | 10/2004 | Allen et al. ............... 709/216 |
| 6,836,832 | B1 | 12/2004 | Klinkner |
| 6,883,065 | B1 | 4/2005 | Pittelkow et al. |
| 7,146,522 | B1 | 12/2006 | Rowe et al. |
| 7,159,080 | B1 | 1/2007 | Coatney et al. |
| 7,296,068 | B1 | 11/2007 | Sarma et al. |
| 2002/0078299 | A1 | 6/2002 | Chiou et al. |
| 2002/0083118 | A1 | 6/2002 | Sim |
| 2002/0099914 | A1 | 7/2002 | Matsunami et al. |
| 2003/0005119 | A1 | 1/2003 | Mercier et al. |
| 2003/0033389 | A1 | 2/2003 | Simpson |
| 2003/0061491 | A1* | 3/2003 | Jaskiewicz et al. .......... 713/182 |
| 2003/0065782 | A1* | 4/2003 | Nishanov et al. ............ 709/226 |
| 2003/0093501 | A1* | 5/2003 | Carlson et al. ............... 709/220 |
| 2003/0097611 | A1 | 5/2003 | Delaney et al. |
| 2003/0212863 | A1 | 11/2003 | Ganguly et al. |
| 2004/0230698 | A1* | 11/2004 | Oeda et al. ................... 709/245 |

OTHER PUBLICATIONS

American National Standards Institute, Inc.; American National Standard for Information Technology—Fibre Channel Arbitrated Loop (FL-AL-2); Dec. 8, 1999.

SNIA Storage Networking Industry Association; Common Internet File System (CIFS), Version: CIFS-Spec. 0.9. Work Group in Progress.

Fibre Channel Generic Services—3 (FC-GS-3), Revision 6.0; NCITS Working Draft Proposed American National Standard for Information Technology; Nov. 24, 1999.

Draft Proposed American National Standard for Information Systems—SCSI-3 Primary Commands; Mar. 28, 1997.

New Identifier Formats Based on IEEE Registration; http://standards.ieee.org/regauth/oui/tutorials/fibreformat.html; Accessed on Aug. 6, 2001.

Soltis S et al. "The Design and Performance of a Shared Disk File System for IRIX" NASA Goddard Space Flight Center Conference on Mass Storage and Technologies in Cooperation with the IEEE Symposium on Mass Storage Systems, Mar. 23, 1998, pp. 1-17, XP002194621.

Hu Yoshida: "Lun Security Considerations for Storage Area Networks" Hitachi Data Systems, 1999, pp. 1-7, XP002185193.

FTP directory/pub/lvm2/ at ftp://sources.redhat.com/pub/lvm2, no. date.

Vgexport.c, Sistina software, part of LVM2.2.01.15.tar, from ftp://sources.redhat.com/pub/lvm2, no. date.

Vgimport.c, Sistana software, part of LVM2.2.01.15.tar, from ftp://sources.redhat.com/pub/lvm2, no. date.

Vgcreate.c, Sistana software, part of LVM2.2.01.15.tar, from ftp://sources.redhat.com/pub/lvm2, no. date.

Vgremove.c, Sistana software, part of LVM2.2.01.15.tar, from ftp://sources.redhat.com/pub/lvm2, no. date.

Metadata.c, Sistana software, part of LVM2.2.01.15.tar, from ftp://sources.redhat.com/pub/lvm2, no. date.

Metadata.h, Sistana software, part of LVM2.2.01.15.tar, from ftp://sources.redhat.com/pub/lvm2, no. date.

* cited by examiner

|  | DISK 1 | DISK 2 | DISK 3 |  |
|---|---|---|---|---|
| INITIAL STATE | <G, G> | <G, G> | <G, G> |  |
| TP1 — STEP 1a | <U, G> | <U, G> | <U, G> |  |
|  | <U, U> | <U, U> | <U, U> | INTERMEDIATE STATE |
|     — STEP 1b | <G, U> | <G, U> | <G, U> |  |
|  | <U, U> | <U, U> | <U, U> | INTERMEDIATE STATE |
| TP2 — STEP 2a | <U, R> | <U, R> | <U, R> |  |
|  | <R, R> | <R, R> | <R, R> | COMPLETED STATE |
|     — STEP 2b | <R, U> | <R, U> | <R, U> |  |
|  | <R, R> | <R, R> | <R, R> | COMPLETED STATE |

FIG. 7

SYSTEMS AND METHOD OF IMPLEMENTING DISK OWNERSHIP IN NETWORKED STORAGE

RELATED APPLICATIONS

This application is related to the following U.S. patent applications:

Ser. No. 10/027,020 entitled SYSTEM AND METHOD FOE TRANSFERRING VOLUME OWNERSHIP IN NETWORKED STORAGE, by Susan M. Coatney et al.

Ser. No. 10/027,330 entitled SYSTEM AND METHOD FOR STORING STORAGE OPERATING SYSTEM DATA IN SWITCH PORTS, by Susan M. Coatney et al.

Ser. No. 10/027,013 entitled SYSTEM AND METHOD FOR ALLOCATING SPARE DISKS IN NETWORKED STORAGE, by Alan L. Rowe et al.

FIELD OF THE INVENTION

The present invention relates to networked file servers, and more particularly to disk ownership in networked file servers.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, conversely, may be implemented as a specially formatted file in which information by other files and directories is stored.

A filer may be further configured to operate according to a client/server model of information delivery to thereby allow many clients to access files stored on a server. In this model, the client may comprise an application, such as a database application, executing on a computer that connects to the filer over a computer network. This computer network could be a point to point link, a shared local area network (LAN), a wide area network (WAN) or a virtual private network (VPN) implemented over a public network such as the Internet. Each client may request the services of the file system on the filer by issuing file system protocol messages (typically in the form of packets) to the filer over the network.

The disk storage typically implemented has one or more storage "volumes" comprised of a collection of physical storage disks, defining an overall logical arrangement of storage space. Currently available filer implementations can serve a large number of discrete volumes (150 or more, for example). Each volume is generally associated with its own file system. The disks within a volume/file system are typically organized as one or more groups of Redundant Array of Independent (or Inexpensive) Disks (RAID). RAID implementations enhance the reliability and integrity of data storage through the redundant writing of data stripes across a given number of physical disks in the RAID group, and the appropriate caching of parity information with respect to the striped data. In the example of a WAFL based file system and process, a RAID 4 implementation is advantageously employed. This implementation specifically entails the striping of data across a group of disks, and separate parity caching within a selected disk of the RAID 4 group.

Each filer is deemed to "own" the disks that comprise the volumes serviced by that filer. This ownership means that the filer is responsible for servicing the data contained on those disks. Only the filer that owns a particular disk should be able to write data to that disk. This solo ownership helps to ensure data integrity and coherency. In prior storage system implementations, it is common for a filer to be connected to a local area network and a fibre channel loop. The fibre channel loop would have a plurality of disks attached thereto. As the filer would be the only device directly connected to the disks via the fibre channel loop, the filer owned the disks on that loop. However, a noted disadvantage of the prior art is the lack of scalability, as there is a limit to a number of disks that may be added to a single fibre channel loop. This limitation prevents a system administrator from having backup filers connected to the disks in the event of failure.

In another prior storage system implementation, two filers, which are utilized as a cluster, could be connected to a single disk drive through the use of the disk's A/B connector. The first filer would be connected to the A connection, while the second filer would be connected to the disk's B connection. In this implementation, the filer connected to a disk's A connection is deemed to own that disk. If the disks are arrayed in a disk shelf, all of the disks contained within that disk shelf share a common connection to the A and B connections. Thus, a filer connected to the A connection of a disk shelf is deemed to own all of the disks in that disk shelf. This lack of granularity (i.e. all disks on a shelf are owned by a single filer) is a known disadvantage with this type of implementation.

Figure 1:
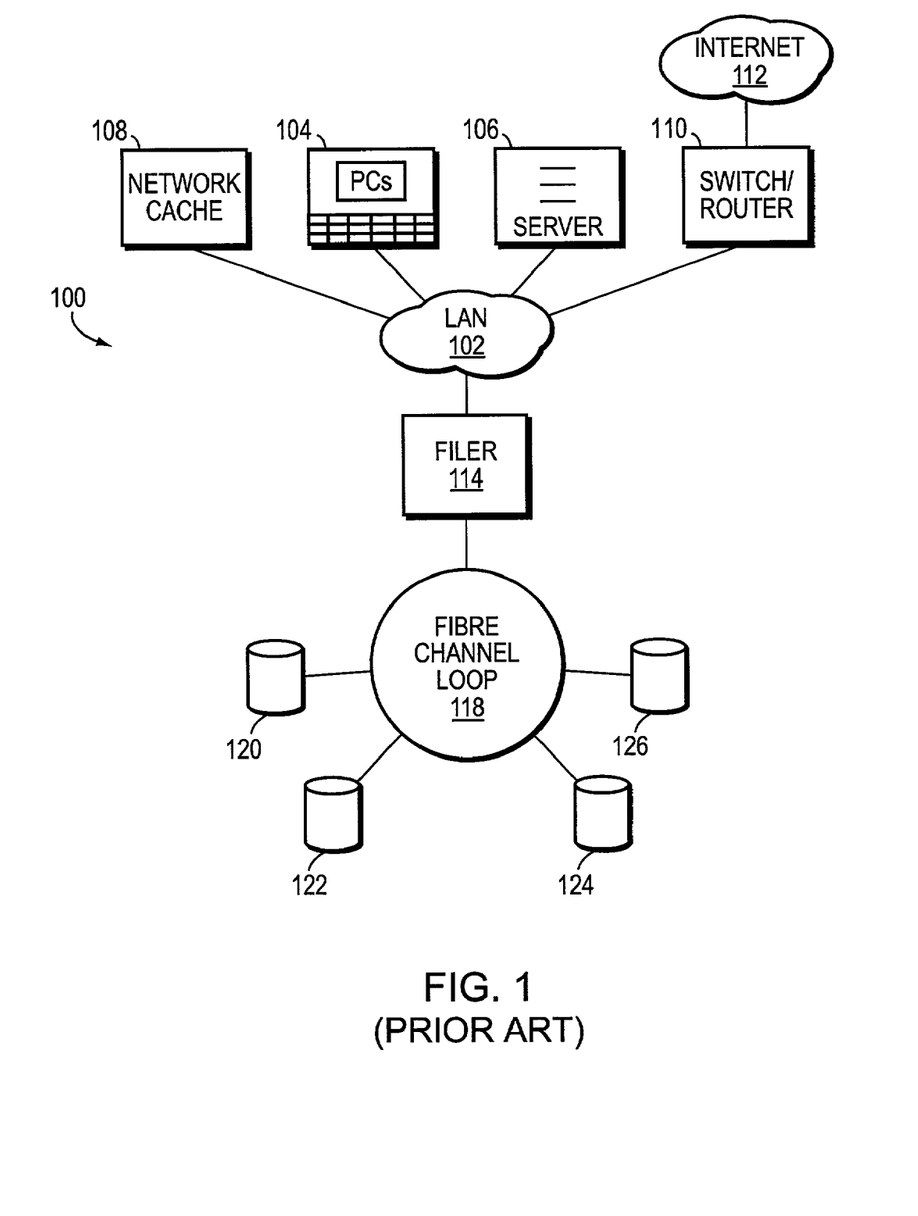
FIG. 1, already described, is a schematic block diagram of a network environment showing the prior art of a filer directly connected to fibre channel loop.

FIG. 1 is a schematic block diagram of an exemplary network environment 100. The network 100 is based around a local area network (LAN) 102 interconnection. However, a wide area network (WAN), virtual private network (VPN), or a combination of LAN, WAN and VPM implementations can be established. For the purposes of this description the term LAN should be taken broadly to include any acceptable networking architecture. The LAN interconnects various clients based upon personal computers 104, servers 106 and a network cache 108. Also interconnected to the LAN may be a switch/router 110 that provides a gateway to the well-known Internet 112, thereby enabling various network devices to transmit and receive Internet based information, including e-mail, web content, and the like.

In this implementation, an exemplary filer 114 is connected to the LAN 102. This filer, described further below is a file server configured to control storage of, and access to, data in a set of interconnected storage volumes. The filer is connected to a fibre channel loop 118. A plurality of disks are also connected to this fibre channel loop. These disks comprise the volumes served by the filer. As described further below, each volume is typically organized to include one or more RAID groups of physical storage disks for increased data storage integrity and reliability. As noted above, in one implementation, each disk has an A/B connection. The disk's A connection could be connected to one fibre channel loop while the B connection is connected to a separate loop. This capability can be utilized to generate redundant data pathways to a disk.

Each of the devices attached to the LAN include an appropriate conventional network interface arrangement (not shown) for communicating over the LAN using desired communication protocol such as the well-known Transport Control Protocol/Internet Protocol (TCP/IP), User Datagram Protocol (UDP), Hypertext Transfer Protocol (HTTP), or Simple Network Management Protocol (SNMP).

One prior implementation of a storage system involves the use of switch zoning. Instead of the filer being directly connected to the fibre channel loop, the filer would be connected to a fibre channel switch, which would then be connected to a plurality of fibre channel loops. Switch zoning is accomplished within the fibre channel switches by manually associating ports of the switch. This association with, and among, the ports would allow a filer connected to a port associated with a port connected to a fibre channel loop containing disks to "see" the disks within that loop. That is, the disks are visible to that port. However, a disadvantage of the switch zoning methodology was that a filer could only see what was within its zone. A zone is defined as all devices that are connected to ports associated with the port to which the filer was connected. Another noted disadvantage of this switch zoning method is that if zoning needs to be modified, an interruption of service occurs as the switches must be taken off-line to modify zoning. Any device attached to one particular zone can only be owned by another device within that zone. It is possible to have multiple filers within a single zone; however, ownership issues then arise as to the disks within that zone.

The need, thus, arises for a technique for a filer to determine which disks it owns other than through a hardware mechanism and zoning contained within a switch. This disk ownership in a networked storage methodology would permit easier scalability of networked storage solutions.

Accordingly, it is an object of the present invention to provide a system and method for implementing disk ownership in a networked storage arrangement.

SUMMARY OF THE INVENTION

This invention overcomes the disadvantages of the prior art by providing a system and method of implementing disk ownership by respective file servers without the need for direct physical connection or switch zoning within fibre channel (or other) switches. A two-part ownership identification system and method is defined. The first part of this ownership method is the writing of ownership information to a predetermined area of each disk. Within the system, this ownership information acts as the definitive ownership attribute. The second part of the ownership method is the setting of a SCSI-3 persistent reservation to allow only the disk owner to write to the disk. This use of a SCSI-3 persistent reservation allows other filers to read the ownership information from the disks. It should be noted that other forms of persistent reservations can be used in accordance with the invention. For example, if a SCSI level 4 command set is generated that includes persistent reservations operating like those contained within the SCSI-3 command, these new reservations are expressly contemplated to be used in accordance with the invention.

By utilizing this ownership system and method, any number of file servers connected to a switching network can read from, but not write to, all of the disks connected to the switching network. In general, this novel ownership system and method enables any number of file servers to be connected to one or more switches organized as a switching fabric with each file server being able to read data from all of the disks connected to the switching fabric. Only the file server that presently owns a particular disk can write to a given disk.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

Figure 2:
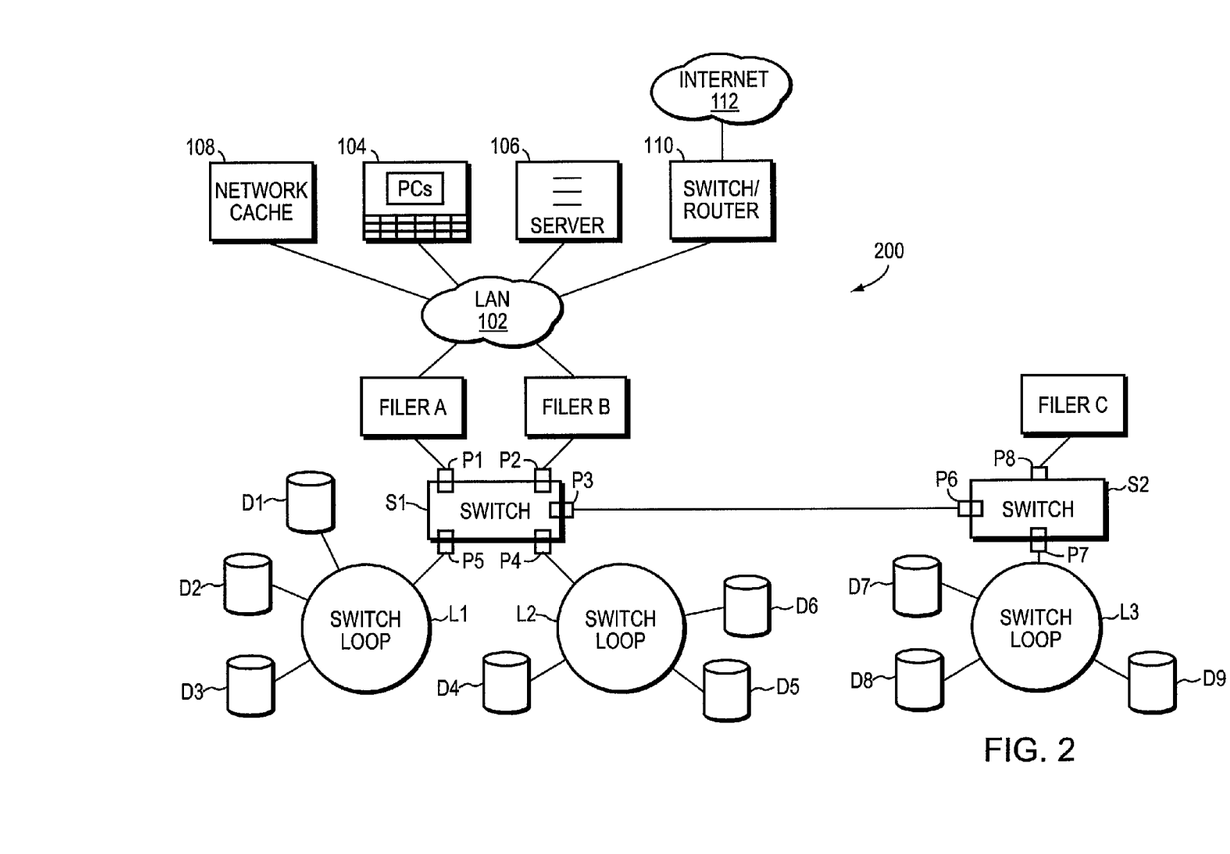
FIG. 2 is a schematic block diagram of a network environment including various network devices including exemplary file servers and associated volumes.

FIG. 2 is a schematic block diagram of an exemplary network environment 200 in which the principles of the present invention are implemented. This network is based around a LAN 102 and includes a plurality of clients such as a network cache 108, personal computers 104, servers 106, and a switch/router 110 for connection to the well-known Internet.

Exemplary file servers, filers A and B, are also connected to the LAN. Filers A and B are also connected to a switch S1. The switch S1 is preferably a fibre channel switch containing a plurality of ports P1, P2, P3, P4 and P5. One example of a fibre channel switch is the Silkworm 6400™ available from Brocade Communications Systems, Inc. of San Jose, Calif. It should be noted that it is expressly contemplated that other forms of switches may be utilized in accordance with the present invention.

Attached to the various ports of switch S1 include fibre channel loops L1 and L2 and a second switch S2. Attached to a port P7 of switch S2 is a third fibre channel loop L3. Each of the fibre channel loops has a plurality of disks attached thereto. In an illustrative configuration, ports P3 and P6 can also be linked to enable switches to communicate as if they are part of a single switching fabric. It should be noted that each port of a switch is assumed to be identical. As such, fibre channel loops, filers or other switches can be connected to any port. The port numbers given here are for illustrative purposes only.

It is preferred to have only one filer own an individual disk. This singular ownership prevents conflicting data writes and helps to ensure data integrity. Switch zoning permits individual ports of a switch to be associated into a zone. As an illustrative example, ports P1 and P5 of switch S1 could be associated into a single zone. Similarly, ports P2 and P4 could be zoned together. This association is made within the individual switch using appropriate switch control hardware and software. This switch zoning creates, in effect, a "hard" partition between individual zones. Note also that the number of switches and ports and their configuration is highly variable. A device attached to a switch can only see and access other devices within the same zone. To change zoning, for example, to move the fibre channel loop attached to port P4 from one zone to another, typically requires taking the entire file server off-line for a period of time.

To overcome the disadvantages of the prior art, ownership information is written to each physical disk. This ownership information permits multiple filers and fibre channel loops to be interconnected, with each filer being able to see all disks connected to the switching network. By "see" it is meant that the filer can recognize the disks present and can read data from the disks. Any filer is then able to read data from any disk, but only the filer that owns a disk may write data to it. This ownership information consists of two ownership attributes. The first attribute is ownership information written to a predetermined area of each disk. This predetermined area is called sector S. This sector S can be any known and constant location on each of the disks. In one embodiment, sector S is sector zero of each of the disks.

The second attribute is Small Computer System Interface (SCSI) level 3 persistent reservations. These SCSI-3 reservations are described in *SCSI Primary Commands*—3, by Committee T10 of the National Committee for Information Technology Standards, which is incorporated fully herein by reference. By using SCSI-3 reservations, non-owning file servers are prevented from writing to a disk; however, the non-owning file servers can still read the ownership information from a predetermined location on the disk. In a preferred embodiment, the ownership information stored in sector S acts as the definitive ownership data. In this preferred embodiment, if the SCSI-3 reservations do not match the sector S data, the sector S ownership is used.

B. File Servers

Figure 3:
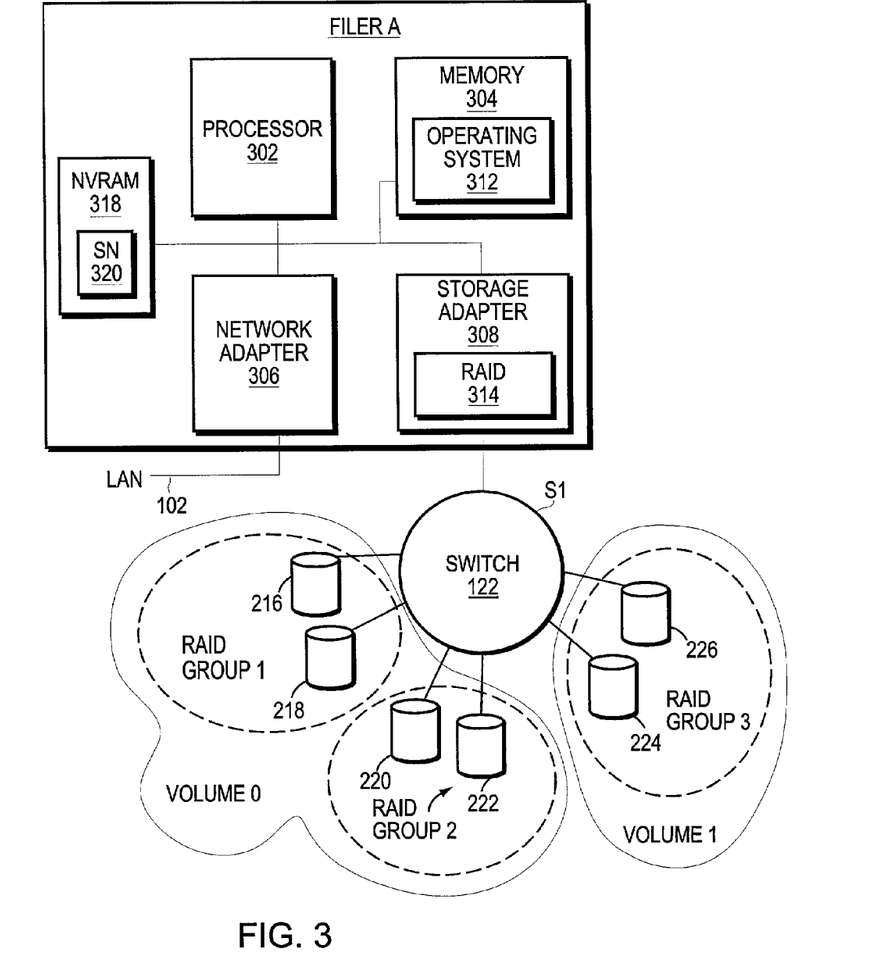
FIG. 3 is a schematic block diagram of an exemplary storage appliance in accordance with FIG. 2.

FIG. 3 is a more-detailed schematic block diagram of illustrative Filer A that is advantageously used with this invention. Other filers can have similar construction, including, for example, Filer B. By way of background, a file server, embodied by a filer, is a computer that provides file service relating to the organization of information on storage devices, such as disks. In addition, it will be understood to those skilled in the art that the inventive technique described herein may apply to any type of special-purpose computer (e.g., server) or general-purpose computer, including a standalone computer, embodied as a file server. Moreover, the teachings of this invention can be adapted to a variety of file server architectures including, but not limited to, a network-attached storage environment, a storage area network and disk assembly directly-attached to a client/host computer. The term "file server" should therefore be taken broadly to include such arrangements.

The file server comprises a processor 302, a memory 304, a network adapter 306 and a storage adapter 308 interconnected by a system bus 310. The file server also includes a storage operating system 312 that implements a file system to logically organize the information as a hierarchical structure of directories and files on the disk. Additionally, a non-volatile RAM (NVRAM) 318 is also connected to the system bus. The NVRAM is used for various filer backup functions according to this embodiment. In addition, within the NVRAM is contained a unique serial number 320. This serial number 320 is preferably generated during the manufacturing of the file server; however, it is contemplated that other forms of generating the serial number may be used, including, but not limited to using a general purpose computer's microprocessor identification number, the file server's media access code (MAC) address, etc.

In the illustrative embodiment, the memory 304 may have storage locations that are addressable by the processor for storing software program code or data structures associated with the present invention. The processor and adapters may, in turn, comprise processing elements and/or logic circuitry configured to execute the software code and manipulate the data structures. The storage operating system 312, portions of which are typically resident in memory and executed by the processing elements, functionally organize a file server by inter-alia invoking storage operations in support of a file service implemented by the file server. It will be apparent by those skilled in the art that other processing and memory implementations, including various computer readable media may be used for storing and executing program instructions pertaining to the inventive technique described herein.

The network adapter 306 comprises the mechanical, electrical and signaling circuitry needed to connect the file server to a client over the computer network, which as described generally above, can comprise a point-to-point connection or a shared medium such as a LAN. A client can be a general-purpose computer configured to execute applications including file system protocols, such as the Network File System (NFS) or the Common Internet File System (CIFS) protocol. Moreover, the client can interact with the file server in accordance with the client/server model of information delivery. The storage adapter cooperates with the storage operating system 312 executing in the file server to access information requested by the client. The information may be stored in a number of storage volumes (Volume 0 and Volume 1) each constructed from an array of physical disks that are organized as RAID groups (RAID GROUPs 1, 2 and 3). The RAID groups include independent physical disks including those storing a striped data and those storing separate parity data. In accordance with a preferred embodiment RAID 4 is used. However, other configurations (e.g., RAID 5) are also contemplated.

The storage adapter 308 includes input/output interface circuitry that couples to the disks over an I/O interconnect arrangement such as a conventional high-speed/high-performance fibre channel serial link topology. The information is retrieved by the storage adapter, and if necessary, processed by the processor (or the adapter itself) prior to being forwarded over the system bus to the network adapter, where the information is formatted into a packet and returned to the client.

To facilitate access to the disks, the storage operating system implements a file system that logically organizes the information as a hierarchical structure of directories in files on the disks. Each on-disk file may be implemented as a set of disk blocks configured to store information such as text, whereas the directory may be implemented as a specially formatted file in which other files and directories are stored. In the illustrative embodiment described herein, the storage operating system associated with each volume is preferably the NetApp® Data ONTAP storage operating system available from Network Appliance Inc. of Sunnyvale, Calif. that implements a Write Anywhere File Layout (WAFL) file system. The preferred storage operating system for the exemplary file server is now described briefly. However, it is expressly contemplated that the principles of this invention can be implemented using a variety of alternate storage operating system architectures.

The host adapter 316, which is connected to the storage adapter of the file server, provides the file server with a unique world wide name, described further below.

C. Storage Operating System and Disk Ownership

Figure 4:
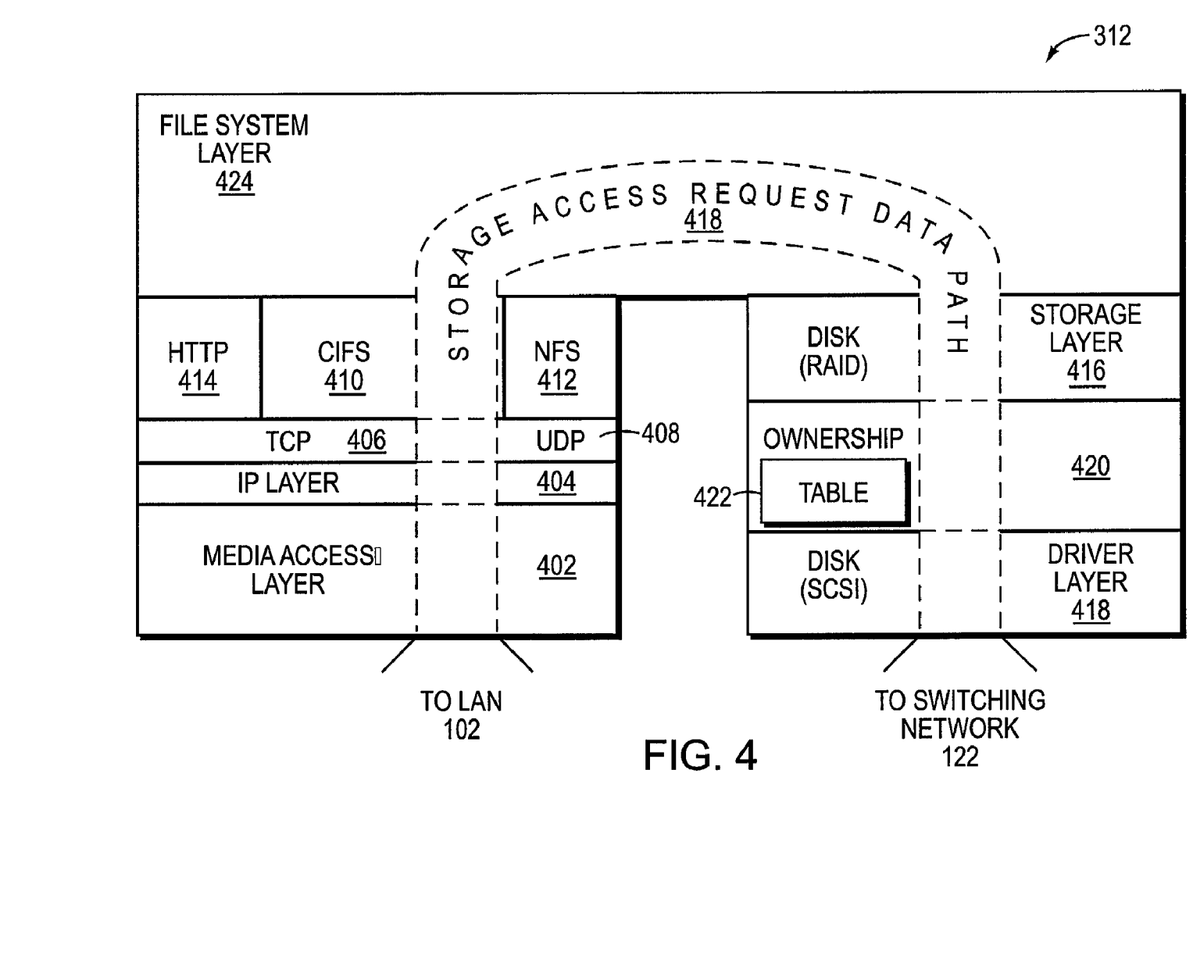
FIG. 4 is a schematic block diagram of a storage operating system for use with the exemplary file server of FIG. 3 according to an embodiment of this invention.

As shown in FIG. 4, the storage operating system 312 comprises a series of software layers including a media access layer 402 of network drivers (e.g., an Ethernet driver). The storage operating system further includes network protocol layers such as the Internet Protocol (IP) layer 404 and its Transport Control Protocol (TCP) layer 406 and a User Datagram Protocol (UDP) layer 408. A file system protocol layer provides multi-protocol data access and, to that end, includes support from the CIFS protocol 410, the Network File System (NFS) protocol 412 and the Hypertext Transfer Protocol (HTTP) protocol 414.

In addition, the storage operating system 312 includes a disk storage layer 416 that implements a disk storage protocol such as a RAID protocol, and a disk driver layer 418 that implements a disk access protocol such as e.g., a Small Computer System Interface (SCSI) protocol. Included within the disk storage layer 416 is a disk ownership layer 420, which manages the ownership of the disks to their related volumes. Notably, the disk ownership layer includes program instructions for writing the proper ownership information to sector S and to the SCSI reservation tags.

As used herein, the term "storage operating system" generally refers to the computer-executable code operable on a storage system that implements file system semantics (such as the above-referenced WAFL) and manages data access. In this sense, ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Bridging the disk software layers, with the network and file system protocol layers, is a file system layer 424 of the storage operating system. Generally, the file system layer 424 implements the file system having an on-disk file format representation that is a block based. The file system generated operations to load/retrieve the requested data of volumes if it not resident "in core," i.e., in the file server's memory. If the information is not in memory, the file system layer indexes into the inode file using the inode number to access an appropriate entry and retrieve a logical block number. The file system layer then passes the logical volume block number to the disk storage/RAID layer, which maps out logical number to a disk block number and sends the later to an appropriate driver of a disk driver layer. The disk driver accesses the disk block number from volumes and loads the requested data into memory for processing by the file server. Upon completion of the request, the file server and storage operating system return a reply, e.g., a conventional acknowledgement packet defined by the CIFS specification, to the client over the network. It should be noted that the software "path" 418 through the storage operating system layers described above needed to perform data storage access for the client received the file server may ultimately be implemented in hardware, software or a combination of hardware and software (firmware, for example).

Figure 5:
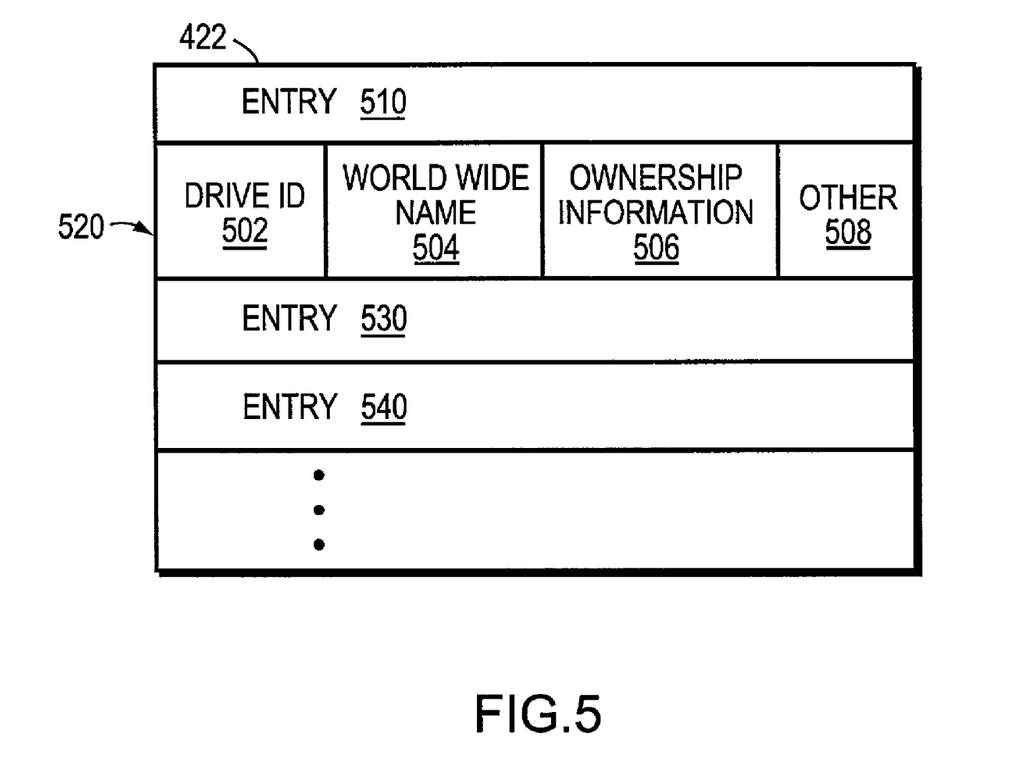
FIG. 5 is a block diagram of an ownership table maintained by the ownership layer of the storage operating system of FIG. 4 in accordance with an embodiment of this invention.

Included within the ownership layer 420 is a disk table 422 containing disk ownership information as shown in FIG. 5. This disk table 422 is generated at boot-up of the file server, and is updated by the various components of the storage operating system to reflect changes in ownership of disks.

FIG. 5 is an illustrative example of the disk table 422 maintained by the ownership layer of the storage operating system. The table comprises a plurality of entries 510, 520, 530 and 540, one for each disk accessible by the subject file server. Illustrative entry 520 includes fields for the drive identification 502, world wide name 504, ownership information 506 and other information 508. The world wide name is a 64-byte identification number which is unique for every item attached to a fibre channel network. World wide names are described in *ANSI X3*.230-1995, *Fibre Channel Physical and Signaling Interface* (FC-PH) and Bob Snively, *New Identifier Formats Based on IEEE* Registration *X3T11/96-467*, *revision* 2, which are hereby incorporated by reference. The world wide name is generally inserted into disk drives during their manufacturing process. For file servers, the world wide name is normally generated by adding additional data bits to the file server serial number contained within the NVRAM. However, it is expressly contemplated that other means for generating a world wide name (or other appropriate standardized unique naming scheme) for file servers are possible, including, but not limited to adding the manufacturer's name to a processor identification, etc.

Figure 6:
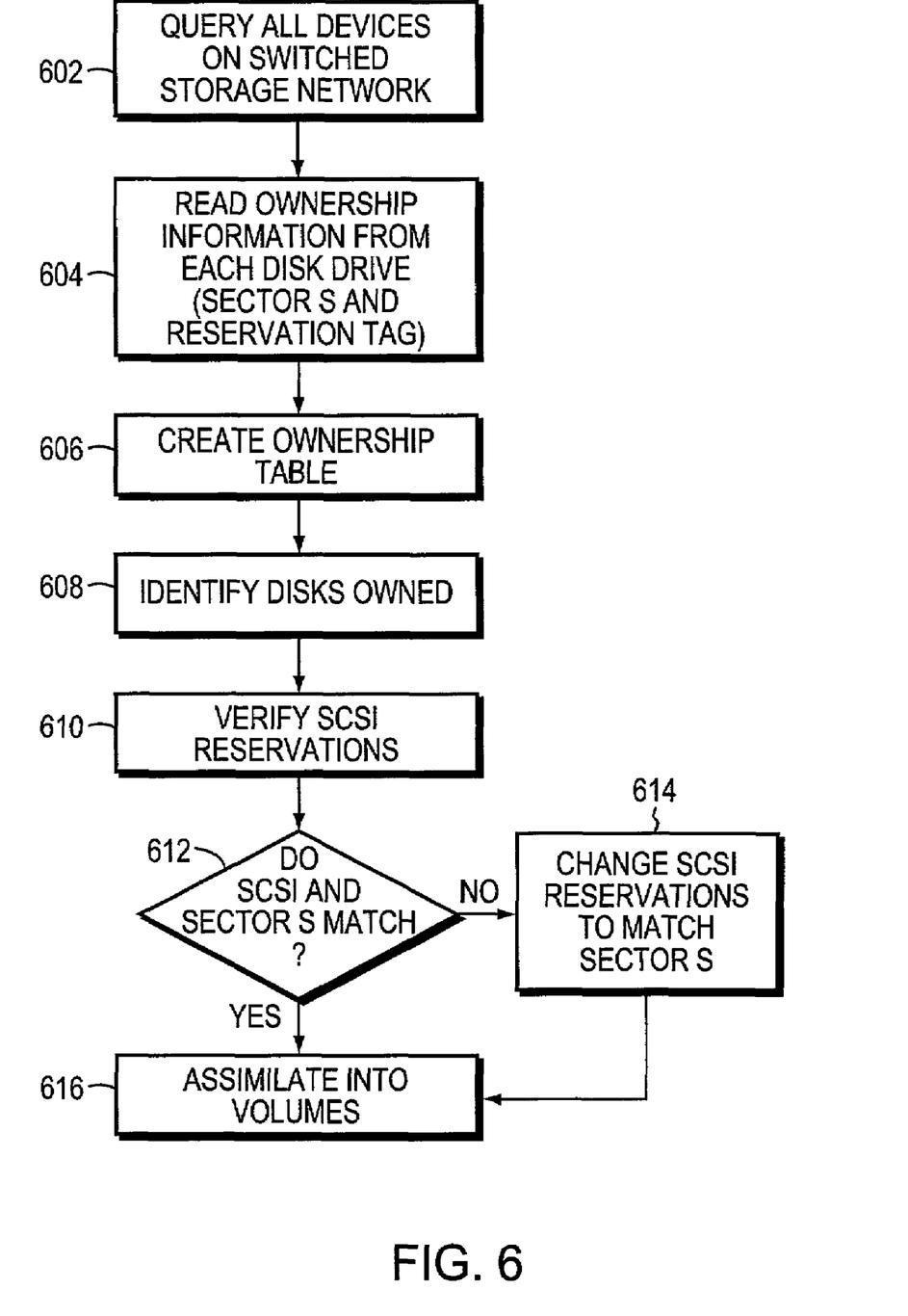
FIG. 6 is a flow chart detailing the steps performed by the storage operating system upon boot up to obtain ownership information of all disks connected to fibre channel switches connected to the individual filer.

FIG. 6 is a flow chart detailing the steps that the various layers of the storage operating system of a file server undergo upon initialization to generate the initial disk ownership table. In step 602, the I/O services and disk driver layer queries all devices attached to the switching network. This query requests information as to the nature of the device attached. Upon the completion of the query, in step 604, the ownership layer 420 (FIG. 4) instructs the disk driver layer 418 to read the ownership information from each disk drive. The disk driver layer reads the sector S ownership information from each physical disk drive identified in the previous step. The ownership layer then creates the ownership table 422 in step 606.

The ownership layer 420 extracts from the disk ownership table 422 the identification of all disks that are owned by this subject file server. The ownership layer then, in step 610, verifies the SCSI reservations on each disk that is owned by that file server by reading the ownership information stored in sector S. If the SCSI reservations and sector S information do not match, the ownership layer will, in step 614, change the SCSI reservation to match the sector S ownership information. Once the SCSI reservations and sector S ownership information match for all the disks identified as being owned by the file server the ownership layer will then pass the information to the disk storage layer for that layer to configure the individual disks into the appropriate RAID groups and volumes for the file server.

The disk ownership layer also provides an application program interface (API) which is accessible by various other layers of the storage operating system. For example, the disk migration layer often undertakes to access the disk table to determine current disk ownership. The disk migration layer is described in U.S. patent application Ser. No. 10/027,020 entitled SYSTEM AND METHOD FOR TRANSFERRING VOLUME OWNERSHIP IN NETWORKED STORAGE by Joydeep Sen Sarma et al., which is hereby incorporated by reference. Additionally, a preselection process, which is part of an administrative graphical user interface (GUI), utilizes the API to access information in the disk ownership table. This preselection process is described in U.S. patent application, Ser. No. 10/027,909 titled METHOD FOR PRESELECTING CANDIDATE DISKS BASED ON VALIDITY FOR VOLUME by Steven Klinkner, which is hereby incorporated by reference.

Additionally, the disk ownership layer continues to update the disk ownership table during the operation of the file server. Thus, when the disk topology changes, the switches involved report the changes to connected file servers. The file servers then update their respective disk ownership tables by executing the method described above.

Figure 7:
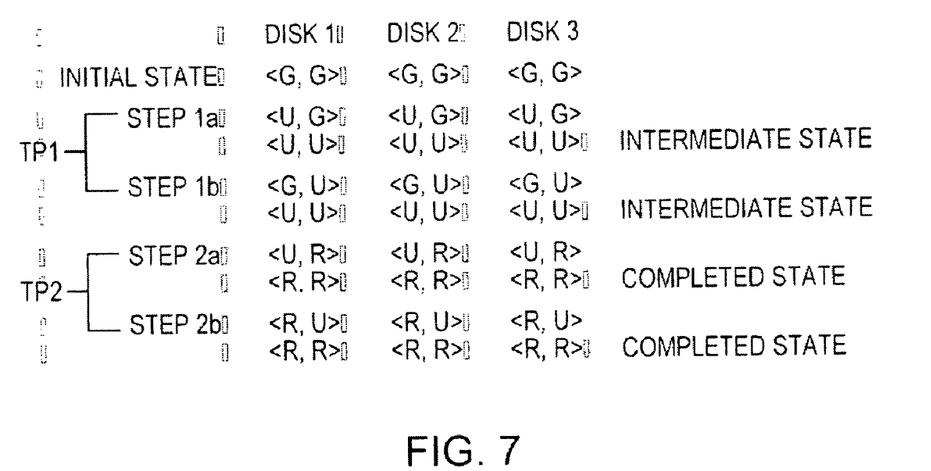
FIG. 7 is a block diagram of the various steps of the transfer process in accordance with an embodiment of this invention.

FIG. 7 shows the steps of the transfer process in accordance with this invention. In this example, Disks 1, 2 and 3 are currently owned by the Green file server and are to be transferred to the Red file server. The initial state shows disks 1, 2 and 3 owned by the green file server. Both the sector S data and the SCSI-3 reservations are labeled as green (i.e. <G,G>). Step one of the transfer process (TP1) is to convert the disks from the initial state into a completely un-owned (U) stage (<U,U>). There are two variants of step one. In step 1*a*, the sector S information is modified to an un-owned state (<U, G>) and then the SCSI-3 reservations are changed to the un-owned state, resulting in <U,U>. Step 1*b* involves first changing the SCSI-3 reservations to an un-owned state (<G, U>). The second part of step 1*b* is changing the sector S data to an un-owned state. At the end of step 1*a* or 1*b* the disks will be completely un-owned, i.e. <U,U> and at the intermediate step.

Step 2 of a transfer process (TP2) involves modifying the disks from the intermediate state <U,U> to a state signifying their ownership by the red file server <R,R>. There are also two alternate methods of performing step 2 of the transfer process. Step 2*a* involves first writing the SCSI reservation data to the disks (<U,R>) and then writing the sector S data. Step 2*b* involves first writing the sector S data (<R,U>) and then writing the SCSI reservation data to the disks. At the end of either step 2*a* or 2*b*, the result will be a disk completely owned by the red file server (<R,R>). When the disks are in a <R,R> state the transfer process has completed the transfer of ownership.

The foregoing has been a detailed description of the invention. Various modification and additions can be made without departing from the spirit and scope of this invention. Furthermore, it is expressly contemplated that the processes shown and described according to this invention can be implemented as software, consisting of a computer-readable medium including program instructions executing on a computer, as hardware or firmware using state machines and the alike, or as a combination of hardware, software, and firmware. Additionally, it is expressly contemplated that other devices connected to a network can have ownership of a disk in a network environment. Accordingly, this description is meant to be taken only by way of example and not to otherwise limit the scope of this invention.

What is claimed is:

1. A method of claiming ownership of a plurality of disks by a network device of a plurality of network devices in a network storage system, comprising:
    writing ownership information to a predetermined area of each disk, wherein the predetermined area of the disk is sector 0 on the disk and the ownership information stored in sector 0 is definitive ownership data for determining ownership of the disk;
    setting a small computer system interface (SCSI) reservation tag for each disk to a state of network device ownership to provide a two part indicia of ownership for each disk, where the two part indicia of ownership are both written to each disk;
    creating a table on each network device in the network storage system;
    identifying all disks owned by each network device using ownership information written to the predetermined area of each disk of the plurality disks and, for each identified disk, if a mismatch occurs between the ownership information on the predetermined area of the disk and the ownership defined by the SCSI reservation tag, then using the ownership information written to the predetermined area of the disk as definite ownership data without requiring the owned network device to send a second SCSI reservation tag;
    in response to identifying, storing entries in the table, wherein each entry identifies an owned disk of the network device storing the table;
    identifying, by a second network device, all disks owned by a first network device in response to a failure of the first network device, wherein each network device can read ownership information of each disk;
    setting a SCSI release tag for each disk owned by the first network device, in response to the failure of the first network device, to transfer the disk to an unowned state; and
    removing ownership information stored in the predetermined area of each disk owned by the first network device to complete transferring each disk into the unowned state.

2. The method of claim 1 wherein the ownership information further comprises a serial number of a network device.

3. The method of claim 1, wherein the network device comprises a file server.

4. The method of claim 1 wherein the small computer system interface reservation tag and the ownership information at the predetermined area of the disk indicate ownership by the same network device.

5. The method of claim 1 wherein the small computer system interface reservation tag is a small computer system interface level 3 persistent reservation tag.

6. A network storage system comprising:
    a plurality of network devices;
    one or more switches, each network device connected to at least one of the one or more switch;
    a plurality of disks having a first ownership attribute written to a predetermined area of each disk and a second ownership attribute in the form of a small computer system interface (SCSI) reservation tag, wherein the first and second ownership attribute are written to each disk, each disk connected to at least one of the plurality of switches, wherein the predetermined area of the disk is sector 0 on the disk and the ownership information stored in sector 0 is definitive ownership data for determining ownership of the disk;
    each network device of the plurality of network devices identifies all disks owned by that network device using ownership information written to the predetermined area of each disk of the plurality disks and, for each identified disk, if a mismatch occurs between the ownership information on the predetermined area of the disk and the ownership defined by the SCSI reservation tag, then using the ownership information written to the predetermined area of the disk as definite ownership data without requiring the owned network device to send a second SCSI reservation tag and each network device is configured with a table and to store entries in a table, wherein each entry identifies an owned disk of the network device storing the table; and a second network device configured to identify all disks owned by a first network device in response to a failure of the first network device, wherein each network device can read ownership information of each disk, to set a SCSI release tag for each disk owned by the first network device, in response to the failure of the first network device, to transfer the disk to an unowned state, and to remove ownership information stored in the predetermined area of each disk owned by the first network device to complete transferring each disk to an unowned state.

7. The network storage system of claim 6, wherein the small computer system interface reservation tag is a small computer system interface level 3 persistent reservation tag.

8. The networked storage system of claim 6, wherein the small computer system interface reservation tag is set such that only the network device may write to the disk.

9. The network storage system of claim 6, wherein the first ownership attribute further comprises a serial number of the network device that owns that particular disk.

10. The network storage system of claim 6, wherein each of the plurality of file servers can read data from each of the plurality of disks.

11. The network storage system of claim 6, wherein only a network device that owns one of the plurality of disks can write data to the one disk.

12. The network storage system of claim 6, wherein the network devices comprise file servers.

13. A network storage system comprising:
a plurality of network devices;
one or more switches;
a plurality of disks; and
means for writing ownership information to a predetermined area of each disk of the plurality of disks, wherein the predetermined area of the disk is sector 0 on the disk and the ownership information stored in sector 0 is definitive ownership data for determining ownership of the disk;
means for setting a small computer system interface (SCSI) reservation tag of each disk to provide a two part indicia of ownership, where the two part indicia of ownership are written to each disk;
means for creating a table on each network device in the network storage system;
means for identifying all disks owned by each network device using ownership information written to the predetermined area of each disk of the plurality disks and, for each identified disk, if a mismatch occurs between the ownership information on the predetermined area of the disk and the ownership defined by the SCSI reservation tag, then using the ownership information written to the predetermined area of the disk as definite ownership data without requiring the owned network device to send a second SCSI reservation tag; in response to identifying, means for storing entries in the table, wherein each entry identifies an owned disk of the network device storing the table; means for identifying, by a second network device, all disks owned by a first network device in response to a failure of the first network device, wherein each network device can read ownership information of each disk
means for setting a SCSI release tag for each disk owned by the first network device, in response to the failure of the first network device, to transfer the disk to an unowned state; and
means for removing ownership information stored in the predetermined area of each disk owned by the first network device to complete transferring each disk into the unowned state.

14. The network storage system of claim 13, wherein the network devices comprise file servers.

15. A network storage system comprising:
one or more switches interconnected to form a switching fabric;
a plurality of disks, each of the disks connected to at least one of the switches, each disk storing a first ownership attribute to a predetermined area of a disk and each disk associated with a second ownership attribute in the form of a small computer system interface reservation, wherein the predetermined area of the disk stores definitive ownership data for determining ownership of the disk and the small computer system interface reservation allows other network devices to read the ownership attribute from the disks; one or more network devices, interconnected with the switching fabric, each of the network devices being configured to own a predetermined set of disks of the plurality of disks though use of the first and second ownership attributes, wherein each network device identifies all disks owned by the network device using ownership information written to the predetermined area of each disk of the plurality disks and, for each identified disk, if a mismatch occurs between the ownership information on the predetermined area of the disk and the ownership defined by the SCSI reservation tag, then using the ownership information written to the predetermined area of the disk as definite ownership data without requiring the owned network device to send a second SCSI reservation tag and each network device is configured with a table and to store entries in a table, wherein each entry identifies an owned disk of the network device storing the table; and a second network device configured to identify all disks owned by a first network device in response to a failure of the first network device, wherein each network device can read ownership information of each disk, to set a SCSI release tag for each disk owned by the first network device, in response to the failure of the first network device, to transfer the disk to an unowned state, and to remove ownership information stored in the predetermined area of each disk owned by the first network device to complete transferring each disk into the unowned state.

16. The network storage system of claim 15, wherein the first ownership attribute further comprises a serial number of one of the one or more network devices.

17. The network storage system of claim 15, wherein the small computer system interface reservation is a small computer system interface level 3 persistent reservation.

18. The network storage system of claim 15, wherein each of the network devices further comprises a disk ownership table, the disk ownership table containing ownership data for each of the disks.

19. The network storage system of claim 18, wherein the ownership table further comprises a world wide name for each of the disks, the world wide name being used for identification of each of the disks.

20. A computer-readable storage medium containing executable program instructions executed by a processor, comprising:
program instructions that write ownership information to a predetermined area of a disk, wherein the predetermined area of the disk stores definitive ownership data for determining ownership of the disk;
program instructions that set a small computer system interface reservation tag for the disk to a state of network device ownership to provide a two part indicia of ownership for the disk, where the two part indicia of ownership are both written to the disk and the small computer system interface reservation tag allows other network devices to read the ownership information from the disks;
program instructions that create a table on each network device in the network storage system;
program instructions that identify all disks owned by the network device using ownership information written to the predetermined area of each disk of the plurality disks and, for each identified disk, if a mismatch occurs between the ownership information on the predetermined area of the disk and the ownership defined by the SCSI reservation tag, then using the ownership information written to the predetermined area of the disk as definite ownership data without requiring the owned network device to send a second SCSI reservation tag;

in response to identifying, program instructions that store entries in the table, wherein each entry identifies an owned disk of the network device storing the table;

program instructions that identify, by a second network device, all disks owned by a first network device in response to a failure of the first network device, wherein each network device can read ownership information of each disk;

program instructions that set a SCSI release tag for each disk owned by the first network device, in response to the failure of the first network device, to transfer the disk to an unowned state; and program instructions that remove ownership information stored in the predetermined area of each disk owned by the first network device to complete transferring each disk into the unowned state.

21. A method for a network device to manage ownership of one or more storage devices in a network storage system, comprising:

reading ownership information from a predetermined area of each storage device, wherein the predetermined area of each storage device is sector 0 on the disk and the ownership information stored in sector 0 is definitive ownership data for determining ownership of the storage device;

in response to reading the ownership information, creating an ownership table that stores entries where each entry identifies a storage device owned by the network device, wherein the ownership is stored within the network device;

reading a small computer system interface (SCSI) reservation tag from each storage device, wherein the SCSI reservation tag allows other network devices to read the ownership information from each storage device;

comparing the SCSI reservation tag to the ownership information of the same storage device and, if there is not a match, changing the SCSI reservation tag to match the ownership information;

configuring the one or more storage devices identified in the ownership table into at least one volume for use by the network device;

identifying, by a second network device, all storage devices owned by a first network device in response to a failure of the first network device, wherein each network device can read ownership information of each storage device;

setting a SCSI release tag for each storage device owned by the first network device, in response to the failure of the first network device, to transfer the storage device to an unowned state; and removing ownership information stored in the predetermined area of each storage device owned by the first network device to complete transferring each storage device into the unowned state.

22. The method of claim 21 further comprising:
setting ownership information at the predetermined area of each storage device.

23. The method of claim 21 wherein the step of configuring further comprises:

organizing the one or more storage devices into at least one Redundant Array of Independent Disks (RAID) group.

24. The method of claim 21 further comprising:
wherein the predetermined area of the one or more storage devices is sector zero of the one or more storage devices.

25. The method of claim 21 further comprising:
wherein the ownership information is a serial number of the network device that owns that particular storage device.

26. The method of claim 21 further comprising:
wherein the ownership table includes a world wide name for each of the storage devices, the world wide name being used to identify each of the storage devices.

27. A network device for managing ownership of one or more storage devices in a network storage system, comprising:

means for reading ownership information from a predetermined area of each storage device, wherein the predetermined area of each storage device stores definitive ownership information for determining ownership of the storage device;

in response to reading the ownership information, means for creating an ownership table that stores entries where each entry identifies a storage device owned by the network device, wherein the ownership is stored within the network device;

means for reading a small computer system interface (SCSI) reservation tag from each storage device, wherein the SCSI reservation tag allows other network devices to read the ownership information from each storage device;

means for comparing the SCSI reservation tag to the ownership information of the same storage device and, if there is not a match, changing the SCSI reservation tag to match the ownership information;

means for configuring the one or more storage devices identified in the ownership table into at least one volume for use by the network device;

means for identifying, by a second network device, all storage devices owned by a first network device in response to a failure of the first network device, wherein each network device can read ownership information of each storage device;

means for setting a SCSI release tag for each storage device owned by the first network device, in response to the failure of the first network device, to transfer the storage device to an unowned state; and means for removing ownership information stored in the predetermined area of each storage device owned by the first network device to complete transferring each storage device into the unowned state.

28. A computer readable storage medium containing executable program instructions executed by a processor, comprising:

program instructions that read ownership information from a predetermined area of each storage device of one or more storage devices in a network storage system, wherein the predetermined area of each storage device stores definitive ownership information for determining ownership of the storage device;

in response to reading the ownership information, program instructions that create an ownership table stores entries where each entry identifies a storage devices owned by the network device, wherein the ownership is stored within the network device;

program instructions that read a small computer system interface (SCSI) reservation tag from each storage device, wherein the SCSI reservation tag allows other network devices to read the ownership information from each storage device;

program instructions that compare the SCSI reservation tag to the ownership information of the same storage device and, if there is not a match, changing the SCSI reservation tag to match the ownership information;

program instructions that configure the one or more storage devices identified in the ownership table into at least one volume for use by the network device;

program instructions that identify, by a second network device, all storage devices owned by a first network device in response to a failure of the first network device, wherein each network device can read ownership information of each storage device;

program instructions that set a SCSI release tag for each storage device owned by the first network device, in response to the failure of the first network device, to transfer the storage device to an unowned state; and program instructions that remove ownership information stored in the predetermined area of each storage device owned by the first network device to complete transferring each storage device into the unowned state.

29. A network storage system, comprising:

one or more storage devices, each storage device having a predetermined area for storing ownership information and each storage device having a small computer system interface (SCSI) reservation tag, wherein the predetermined area of each storage device stores definitive ownership information for determining ownership of the storage device, and the SCSI reservation tag allows other network devices to read the ownership information from each storage device;

at least one network device having an ownership table constructed based upon the ownership information from each storage device, wherein the ownership is stored within the network device;

the at least one network device having an ownership layer for comparing the SCSI reservation tag to the ownership information of the same storage device and, if there is not a match, changing the SCSI reservation tag to match the ownership information; and the at least one network device having a disk storage layer for configuring the one or more storage devices identified in the ownership table into at least one volume for use by the network device; and a second network device configured to identify all disks owned by a first network device in response to a failure of the first network device, wherein each network device can read ownership information of each disk, to set a SCSI release tag for each disk owned by the first network device, in response to the failure of the first network device, to transfer the disk to an unowned state, and to remove ownership information stored in the predetermined area of each disk owned by the first network device to complete transferring each disk into the unowned state.

30. The network storage system of claim 29 further comprising:

the ownership layer adapted to set ownership information at the predetermined area of each storage device.

31. The network storage system of claim 29 further comprising:

the disk storage layer organizing the one or more storage devices into at least one Redundant Array of Independent Disks (RAID) group.

32. The network storage system of claim 29 further comprising:

wherein the predetermined area of the one or more storage devices is sector zero of the one or more storage devices.

33. The network storage system of claim 29 further comprising:

wherein the ownership information is a serial number of the network device that owns that particular storage device.

34. The network storage system of claim 29 further comprising:

wherein the ownership table includes a world wide name for each of the storage devices, the world wide name being used to identify each of the storage devices.

* * * * *

UNITED STATES PATENT AND TRADEMARK OFFICE
CERTIFICATE OF CORRECTION

PATENT NO. : 7,650,412 B2
APPLICATION NO. : 10/027457
DATED : January 19, 2010
INVENTOR(S) : Susan M. Coatney It is certified that error appears in the above-identified patent and that said Letters Patent is hereby corrected as shown below:

Col. 10, line 66, claim 6 please amend as shown:

device to complete transferring each disk ~~to an~~ into the unowned

Col. 11, line 48, claim 13 please amend as shown:

in ~~reponse~~ response to a failure of the first network device;

Col. 12, line 9, claim 15 please amend as shown:

mined set of disks of the plurality of disks ~~though~~ through use of

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,650,412 B2
APPLICATION NO. : 10/027457
DATED : January 19, 2010
INVENTOR(S) : Coatney et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 943 days.

Signed and Sealed this

Twenty-third Day of November, 2010

David J. Kappos
*Director of the United States Patent and Trademark Office*